United States Patent [19]

Emilsson

[11] Patent Number: 4,527,666
[45] Date of Patent: Jul. 9, 1985

[54] RAIL VEHICLE DISC BRAKE ARRANGEMENT

[75] Inventor: Fred S. Emilsson, Trelleborg, Sweden

[73] Assignee: SAB Nife AB, Landskrona, Sweden

[21] Appl. No.: 538,894

[22] Filed: Oct. 4, 1983

[30] Foreign Application Priority Data

Oct. 5, 1982 [SE] Sweden .................... 8205665

[51] Int. Cl.³ .......................... B61H 13/00
[52] U.S. Cl. ............................ 188/33; 188/59;
188/71.8; 188/198; 192/111 A
[58] Field of Search ............... 188/33, 56, 79.5 R,
188/71.7, 71.8, 196 R, 196 A, 196 C, 197, 198,
203, 196 M, 196 V, 58, 59, 72.1, 71.1, 28;
192/70.25, 111 R, 111 A

[56] References Cited

U.S. PATENT DOCUMENTS

| 343,680 | 6/1886 | Fribe | 188/197 X |
| 2,951,560 | 9/1960 | Smellie | 188/71.8 X |
| 3,624,765 | 11/1971 | Hauth | 188/59 X |
| 3,851,546 | 12/1974 | Kepple et al. | 188/59 X |
| 3,908,803 | 9/1975 | Otto et al. | 188/71.8 |

FOREIGN PATENT DOCUMENTS

| 580862 | 7/1933 | Fed. Rep. of Germany | 188/71.8 |
| 2727473 | 3/1978 | Fed. Rep. of Germany | 188/59 |
| 950824 | 2/1964 | United Kingdom | 188/71.7 |

Primary Examiner—Bruce H. Stoner, Jr.
Assistant Examiner—Robert J. Oberleitner
Attorney, Agent, or Firm—Laurence R. Brown

[57] ABSTRACT

A rail vehicle disc brake arrangement is provided with a brake cylinder (8-10), a slack adjuster (14), and pad holders (3, 4) with brake pads (5, 6) on either side of a disc (7) to be braked. In order to attain a compact and cheap but forceful and reliable arrangement the brake cylinder (8-10), the slack adjuster (14) of pulling type and a first pad holder (3) with brake pad (5) are combined to a unit (1). The unit has a bracket (16), to which a brake lever (2) is pivotally attached. The opposite end of this lever is provided with a pivotal second pad holder (4) with brake pad (6), whereas the slack adjuster is connected to an intermediate point thereof.

3 Claims, 1 Drawing Figure

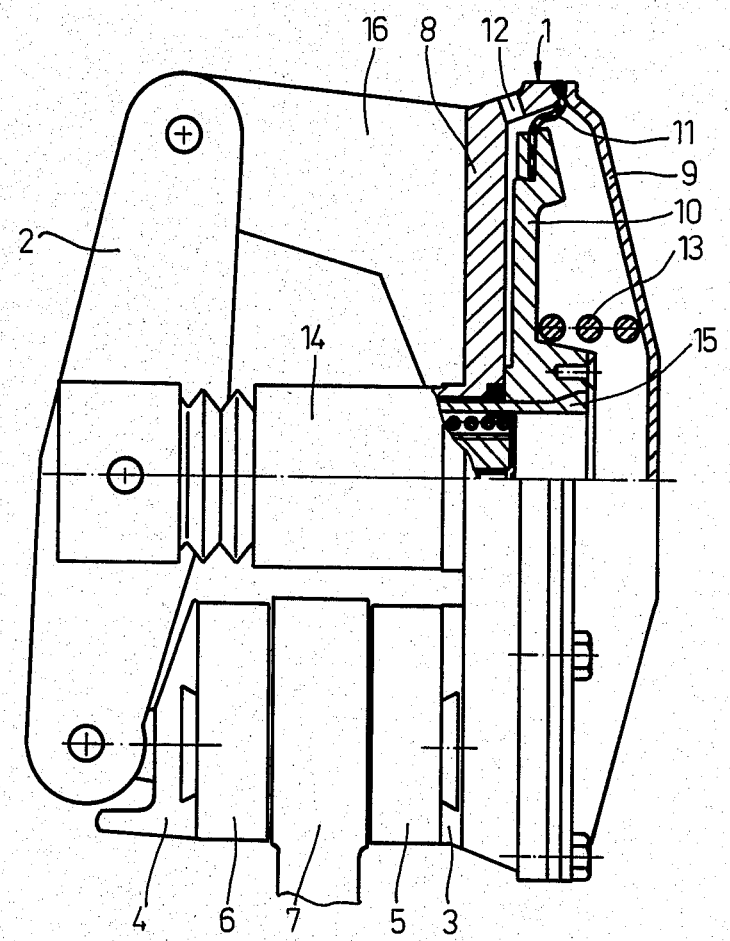

RAIL VEHICLE DISC BRAKE ARRANGEMENT

TECHNICAL FIELD

The present invention relates to a rail vehicle dick brake arrangement in the form of a disc brake caliper to be suspended from an underframe or bogie of the vehicle in the vicinity of a disc to be braked, the caliper being provided with a brake cylinder, a slack adjuster, and pad holders with brake pads on either side of the disc.

BACKGROUND ART

In the conventional and most common type of disc brake arrangement as defined above a so called brake unit, i.e. a brake cylinder with built-in slack adjuster of pushing type, is arranged between the ends of two brake levers, which at their opposite ends are provided with the pad holders and at intermediate points are pivoted to and interconnected by means of a cross bar. The arrangement is suspended in a comparatively complicated way.

This arrangement is complex, heavy and costly, although for most purposes it is chosen, partly because its different parts are standardized to a certain degree and thus are interchangable.

However, there is a tendency in the rail vehicle construction industry to minimize the available space around the brake discs, which may be separate or wheel-mounted. Thus in many modern constructions a conventional disc brake arrangement as described cannot be used.

Different special disc brake arrangements aiming at obviating the problems and drawbacks dealt with above have been suggested, but they all suffer from different disadvantages.

THE INVENTION

The object of the present invention is thus to provide a rail vehicle disc brake arrangement which is simple, light-weight and cheap and above all requires a minimum space in the vicinity of the brake disc.

This is according to the invention attained in that a brake lever at its end remote from the disc is pivotally attached to a unit including the brake cylinder, the slack adjuster, and a first pad holder with brake pad and at its end at the disc is provided with a second pad holder with brake pad, the slack adjuster of pulling type being connected to an intermediate point of the brake lever.

Preferably a housing of the brake cylinder is provided with the first pad holder and an attachment or bracket for the brake lever.

A further advantage from the construction viewpoint is attained in that a housing for the slack adjuster is integrated with the brake cylinder housing.

In this way the overall length of the arrangement corresponds to the diameter of the brake cylinder, whose housing can be manufactured in one piece with brake lever bracket, slack adjuster housing, and pad holder.

BRIEF DESCRIPTION OF THE DRAWING

The invention will be described in further detail below reference being made to the accompanying drawing, which in a plan view and partly in section illustrates a disc brake arrangement according to the invention.

DETAILED DESCRIPTION OF A PREFERRED EMBODIMENT

A disc brake arrangement according to the invention primarily consists of only a few parts: a unit 1 (to be described below), a brake lever 2 pivotally attached thereto, and pad holders 3, 4 with brake pads 5, 6. The whole arrangement is to be suspended in any conventional way, forming no part of the present invention, from a rail vehicle underframe or bogie in the vicinity of a disc 7 to be braked.

A brake cylinder is formed of a cylinder housing 8, which has a bolted-on lid 9, and a piston 10. An annular diaphragm 11 is attached to the piston 10 and is clamped between the housing 8 and the lid 9. At the admission of brake fluid (compressed air) through an inlet 12 the piston 10 will be forced to the right in the drawing. A return spring 13 is arranged between the lid 9 and the piston 10.

A conventional slack adjuster 14 of pulling type, per se forming no part of the invention, is directly connected to the piston rod 15 for the piston 10. Its housing is preferably integral with the cylinder housing 8.

The cylinder housing 8 is provided with a first brake pad holder 3 having an replaceable brake pad 5 and with a bracket 16.

The parts 3, 5 and 8-16 together form the unit 1.

The brake lever 2 is at one end pivotally attached to the bracket 16 and at its opposite end provided with a pivotal second brake pad holder 4 having a replaceable brake pad 6. The slack adjuster 14 is pivotally connected to the brake lever 2 at an intermediate point.

It is evident that at the admission of brake fluid through the inlet 12, the piston 10 and the slack adjuster mechanism will move to the right in the drawing, forcing the brake lever 2 to swing in the counter-clockwise direction around its pivot on the bracket 16, so that the brake pads 5 and 6 will be applied against the disc 7. Due to the existence of the slack adjuster 14 the slack between the brake pads 5, 6 and the disc 7 will always be held at the proper value irrespective of the wear of the brake pads 5 and 6, and accordingly only a limited movement of the piston 10 is necessary for a brake application.

Modifications are possible within the scope of the appended claims. Especially it should be noted that the internal design of the brake cylinder and the slack adjuster can be widely varied. Also, the cylinder may be hydraulic instead of pneumatic.

I claim:

1. A rail vehicle disc brake system with a disc brake caliper to be suspended from said vehicle to span a vehicle disc to be braked, comprising in combination, a housing having a brake cylinder mounted within said housing and having a movable piston therein operable to reciprocably move said caliper, a slack adjuster of the pulling type mounted on said housing centered with respect to said cylinder coupled to said piston to compensate for brake wear, a lever mount and a brake pad mount positioned on opposite sides of said slack adjuster and affixed to said housing, a brake lever pivoted on one end opposite the disc on said housing at said lever mount and at an intermediate point on said slack adjuster and thereby being coupled to said piston and at the opposite end carrying a brake pad for engaging the disc in response to movement of said piston, and a second brake pad mounted on the brake pad mount of said housing for engaging said disc in response to movement of said piston.

2. A brake system as defined in claim 1 wherein said housing surrounds the cylinder and has substantially the same circumference, and is substantially normal to and diametrically opposed to said extension off said housing directed toward the disc containing said second brake pad and forming a bracket for pivoting one end of said brake lever.

3. A rail vehicle disc brake system with a disc brake caliper to be suspended from said vehicle to span a vehicle disc to be braked, comprising in combination, a housing, a flat brake cylinder mounted within said housing having a movable piston operable to reciprocatively move the brakes, a first brake pad carried by said housing positioned to engage the disc to be braked, a slack adjuster of the pulling type mounted on said housing coupled to the piston of said cylinder to compensate for brake wear, a bracket extending off said housing above said slack adjuster, a brake lever pivoted at one end to the free end of said bracket, at an intermediate portion, to said slack adjuster, and at its opposite end to a brake pad holder carrying a second brake pad positioned to engage the disc to be braked in complement with said first brake pad, both of which respond to movement of said cylinder.

* * * * *